United States Patent

[11] 3,571,644

[72] Inventor Albert Jakoubovitch
Buhl, France

[21] Appl. No. 794,301
[22] Filed Jan. 27, 1969
[45] Patented Mar. 23, 1971

[73] Assignee Societe Anonyme Heurtey
Paris, France

[54] HIGH FREQUENCY OSCILLATOR FOR INDUCTIVE HEATING
3 Claims, 2 Drawing Figs.

[52] U.S. Cl. ........................................ 331/74, 219/10.75, 331/151, 331/167
[51] Int. Cl. ........................................ H03b 5/10, H05b 5/00
[50] Field of Search ........................................ 331/151; 1/167, 74, 10.77; 219/10.75

[56] References Cited

UNITED STATES PATENTS

| | | | |
|---|---|---|---|
| 2,589,477 | 3/1952 | Corporon .................... | 219/10.77X |
| 2,765,387 | 10/1956 | Wilson .................... | 219/10.77X |

*Primary Examiner*—Roy Lake
*Assistant Examiner*—Siegfried H. Grimm
*Attorney*—Wenderoth, Lind & Ponack

ABSTRACT: An electric current generator, notably high frequency generator, for supplying feed current to an inductor more particularly for heating purposes. Between the inductor and an oscillator tube is disposed an aperiodic impedance-matching transformer delivering low voltage current to an oscillating circuit consisting of said inductor and one or a plurality of capacitors. A line is disposed between the oscillating circuit and the oscillator tube. The function of this line is to convey the energy necessary for sustaining the oscillation.

ALBERT JAKOUBOVITCH, Inventor

By, Wenderoth, Lind & Ponack
Attorneys

ALBERT JAKOUBOVITCH, Inventor

By, Wenderoth, Lind & Ponack
Attorneys

HIGH FREQUENCY OSCILLATOR FOR INDUCTIVE HEATING

The present invention relates in general to electric current generators and has specific reference to high frequency generators of the type designed for supplying feed current to an inductor intended more particularly for heating purposes, for example in the heat treatments of metals.

It is current practice to provide an oscillating circuit determining the oscillation frequency of the generator and which is connected directly between the anode and cathode of the oscillator tube. The voltage across the terminals of the oscillating circuit is then several kilovolts. The oscillator tube is connected to the inductor either through the medium of a high frequency transformer or through an inductance voltage divider. The HF transformer coupled to the inductor or to the inductor and the division reactances constitutes the total inductance of the oscillating circuit.

In order to obtain a power output P across the inductor a reactive power Q must be supplied thereto which is 10 to 20 times said power output P. On the other hand, the reactive power transfer coefficient is very low in the case of HF transformers as a rule 20 to 30 percent. The total reactive power to be supplied is therefore 50 to 60 times the active power output to be utilized. As a consequence, a current of considerable strength is caused to flow through the circuits and the efficiency of the oscillating circuit is of the order of 80 percent.

According to a more elaborate technique to which this invention refers more particularly a generator system is used which comprises a tube oscillator and an inductor, between which an aperiodic impedance-matching transformer is inserted for delivering low voltage current to an oscillating circuit comprising the whole or part of said inductor.

Hitherto known devices of this general character permit of constructing aperiodic or deadbeat generators the frequency of which is subordinate to the characteristics of the oscillating circuit. The aperiodic nature of these known device provides substantial improvements over the technique mentioned in the foregoing, from the dual point of view of the oscillating circuit efficiency, which becomes very high and may even attain 95 percent or more, and of the possibility of utilizing lines between the generator and the load.

However, these devices are still objectionable in that they permit several possible oscillation ratings, notably along the connecting lines, at the inherent frequencies of the aperiodic impedance-matching transformer.

It is the chief object of the present invention to provide an improved generator system capable of eliminating undersired operating conditions.

The improvement characterizing the high frequency generator according to this invention consists in deriving the oscillation-maintaining energy across the terminals of the oscillating circuits consisting of the inductor associated with a row of capacitors, by means of a line disposed between the oscillating circuit and the oscillation generator.

The arrangement according to this invention permits of utilizing this line as a filter element for any frequency other than the desired frequency. As a rule, a line of which the characteristic impedance approaches the load impedance of the generator will be used, the voltage drop caused by any frequency other than the rated or proper operating frequency of the generator being such that it precludes any possibility of oscillation at the frequencies to be eliminated when the length of the lines is equal to or greater than a few meters.

With the arrangement characterizing this invention a satisfactory and adequate operation of the generator can be obtained by using only one additional line between the oscillating circuit and said generator, said single line conveying only the oscillator maintaining power.

Two typical examples illustrating the manner in which this invention may be carried out will now be described with reference to the attached drawings, in which.

Figure 1:
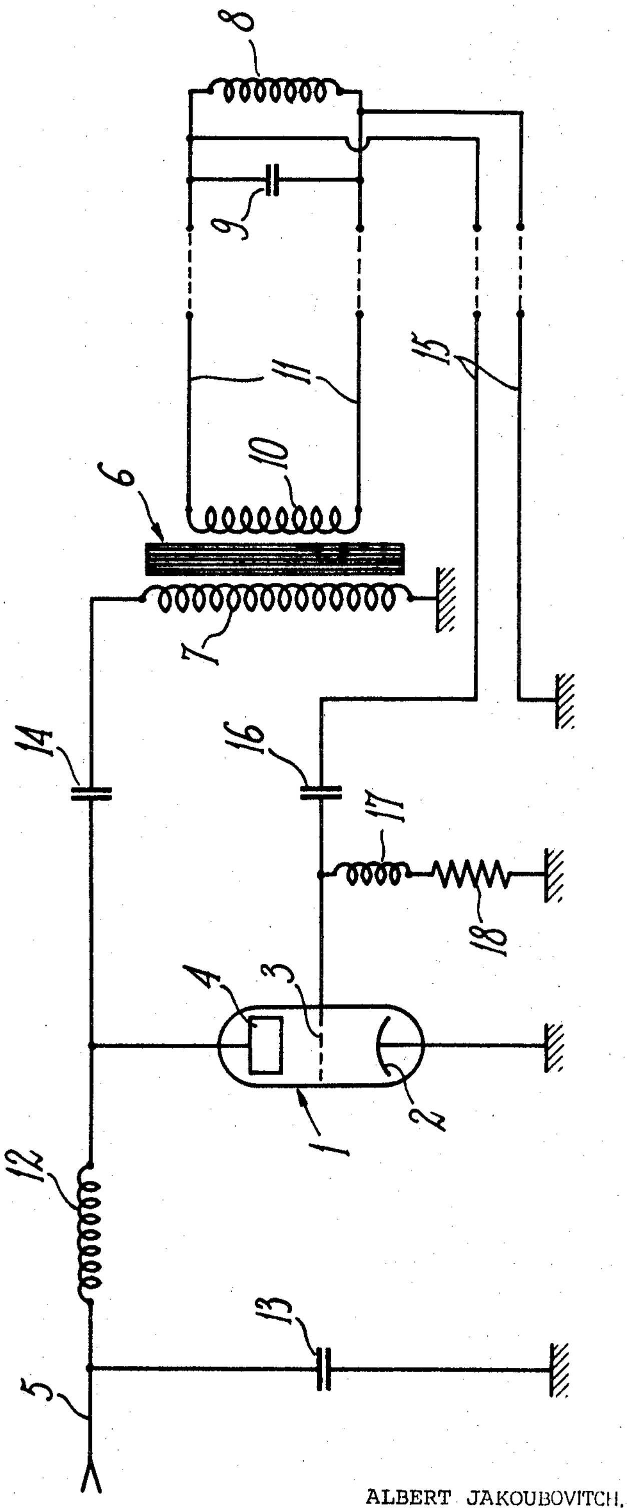
FIG. 1 is a wiring diagram concerning a first form of embodiment.

In these FIGS. the reference numeral 1 designates the oscillator tube of the generator, with its cathode 2, grid 3 and anode 4, this anode being connected to the high voltage source at 5. The anode to cathode circuit comprises a reactance 12 and a capacitor 13. The primary of an impedance-matching transformer 6 is connected between the cathode 2 and anode 4 with the interposition of a capacitor 14. The oscillating circuit comprising the reactance 8 (which may constitute the whole or part of the inductor) and one or a plurality of capacitors 9 is connected across the terminals of the secondary 10 of said transformer by a line 11.

This line 11 conveys the generator power from the impedance matching transformer 6 to the inductance 8 tuned by the capacitor or capacitors 9.

In addition to said line 11 the device comprises, in the form of embodiment illustrated in FIG. 1, another line 15 connected to the oscillating circuit 8, 9. The function of this line 15 is only to convey the energy necessary for maintaining the oscillating tube 1. The line 15 feeds the energizing power of this tube through the medium of the coupling capacitor 16 back to the grid 3 of said tube. Line 11 is formed from two conductors connecting the secondary 10 of the impedance transformer 6 to the assembly formed by the inductance 8 associated with a battery of condensers 9, such line serving to convey the electrical energy produced by the generator tube 1 by said inductance and forming moreover an element of the oscillating circuit.

Line 15 formed by conductors connected to the elements 8 and 9 of the oscillating circuit serves as a regenerative feedback in order to supply the energy of oscillation of the tube 1, the two ends being connected respectively to the grid 3 and the cathode 2 of the tube. This line has a characteristic impedance near the load impedance of the generator and forms a filter which prevents the operation of the device upon any frequency other than that resulting from the association of the inductance 8 and the battery 9 of condensers associated therewith.

The reference numerals 17 and 18 denote a barrier inductance and a bias resistor, respectively.

Figure 2:
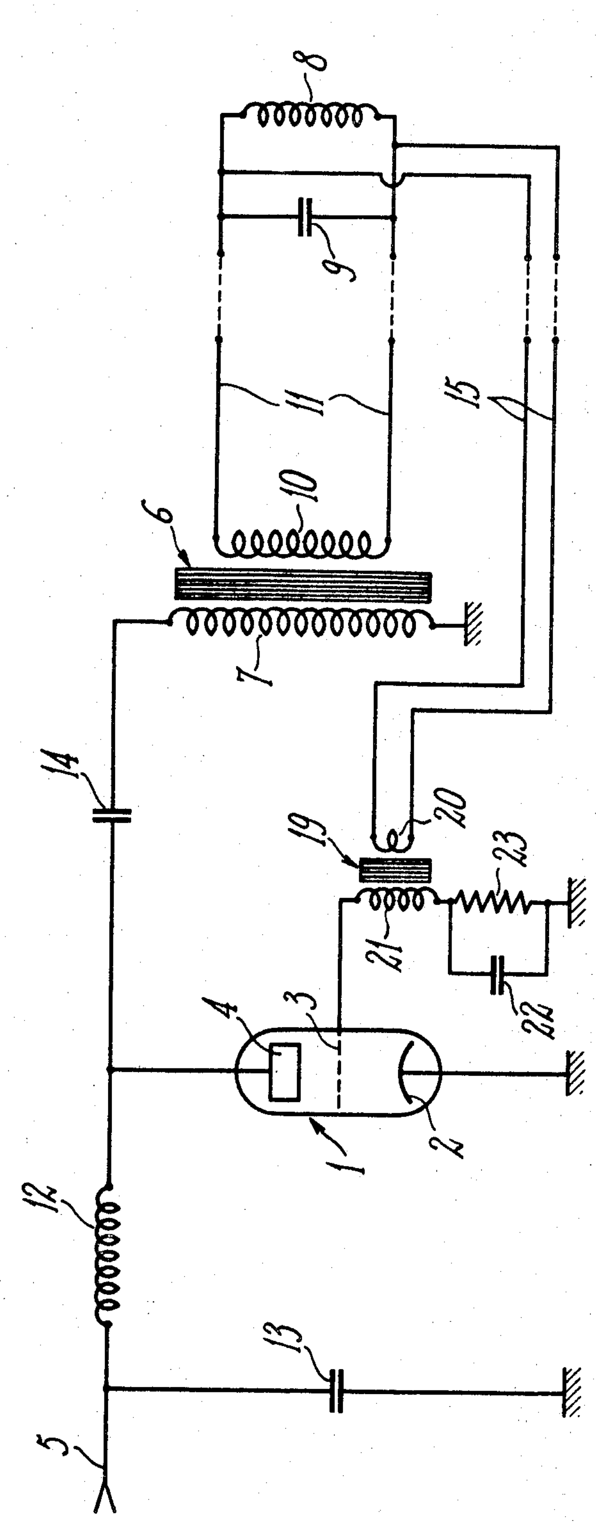
FIG. 2 is another wiring diagram showing a modified form of embodiment.

In the alternate form of embodiment illustrated in FIG. 2, the energizing voltage supplied via line 15 is fed to feedback grid 3 by means of a transformer 19 having its primary 20 connected to said line 15. The secondary 21 connected to said grid is provided with elements 22 and 23 constituting a bypass capacitor and a bias resistor, respectively.

EXAMPLE oscillator 1 = 10 kW tube TBW 6/14 manufactured by Philips
capacitor 13 = 10,000 *pf.*
reactance 12 = 100 $\mu$Hy. with a resonance frequency nearly equal to the operating frequency of the oscillator (about 200 kHz.
capacitor 14 = 10,000 *pf.*
transformer 6 = transformer ratio = 1:4
tuning capacitor 9 = 250,000 *pf.*
inductor 8 = 2.5 $\mu$ *h*
lines 11—15:
length = 10 meters, consisting of a four-conductor cable, the conductors being disposed in parallel by pairs,
capacitor 16 = 10,000 *pf.*
resistor 18 = 1,000 ohms
inductance 17 = 100 $\mu$ *h*
transformer 19 (FIG. 2) = transformer ratio = 1 with tapping points permitting of varying the excitation voltage of the oscillating tube by plus or minus 10 percent,
capacitor 22 = 10,000 *pf.*
resistor 23 = 1,000 ohms

I claim:

1. A device for supplying energizing power to an inductor for heating purposes comprising an oscillating circuit formed by an oscillator tube producing high frequency currents, an inductor for heating associated in parallel with a battery of condensers and an aperiodic impedance-matching transformer between said oscillator tube and said inductor for heating, a line operating as a regenerative feedback at the neighborhood of its characteristic impedance disposed between the secondary of said transformer and the grid of said tube, said line forming a filter preventing the operation of said device upon any frequency other than that resulting from the association of said inductor and said battery of condensers associated with said inductor.

2. A device according to claim 1 wherein said line is connected via a capacitor to the grid of said oscillator tube.

3. A device according to claim 1 wherein the voltage in said line is fed to the grid of said oscillator tube via a transformer.